May 31, 1949.  K. A. LANG  2,471,823
CURRENT REGULATING DEVICE
Filed June 13, 1945
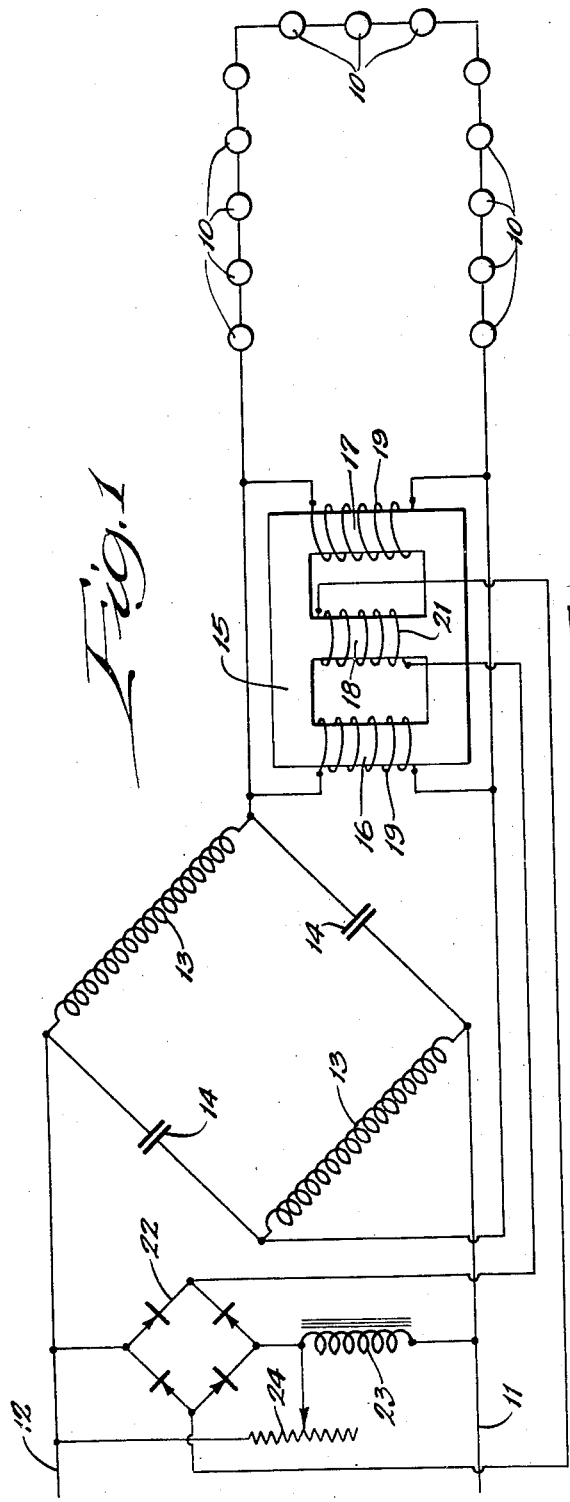
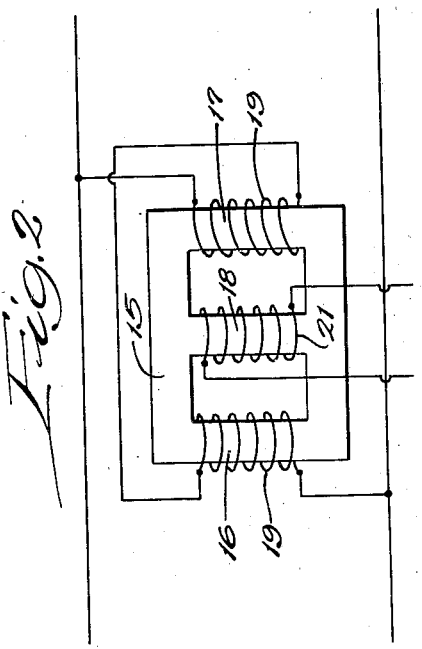
Inventor:
Karl A. Lang,
By
Dawson, Ooms any Booth.
Attorneys.

Patented May 31, 1949

2,471,823

UNITED STATES PATENT OFFICE 2,471,823

CURRENT REGULATING DEVICE

Karl A. Lang, Glenview, Ill., assignor to Lindberg Engineering Company, Chicago, Ill., a corporation of Illinois Application June 13, 1945, Serial No. 599,135

8 Claims. (Cl. 323—7)

This invention relates to current regulating devices and more particularly to devices for supplying a load with a constant current from an alternating current supply source.

Resonant type constant current regulators have heretofore been proposed but in such devices variations in supply voltage tend to produce corresponding variations in load current. It is one of the principal objects of the present invention to provide a current regulating device in which variations in supply voltage are compensated to maintain the load current constant.

Another object is to provide a current regulating device in which the load current is maintained constant by variably bypassing current across the load side of the regulator in response to voltage changes on the supply side.

Still another object is to provide a current regulating device including a saturable reactor across the load side whose saturation is varied in response to voltage changes on the supply side. According to one feature of the invention, the saturating current varies at an amplified rate in response to voltage changes to produce full compensation.

The above and other objects and advantages of the invention will be more readily apparent from the following description when read in connection with the accompanying drawing, in which—

Figure 1 is a circuit diagram of one form of the device embodying the invention and Figure 2 is a partial diagram of an alternative construction.

In the circuit shown in Figure 1, a load indicated as a plurality of lamps 10 connected in series is adapted to be supplied with constant current from a supply source including the wires 11 and 12. The supply wires 11 and 12 are connected to opposite corners of a resonant type constant potential to constant current regulating device including a pair of reactors 13 and a pair of condensers 14 connected in a bridge circuit. The remaining corners of the monocyclic square are connected across the load circuit, as shown. With this type of construction, as so far described, as long as the potential across the supply lines 11 and 12 remains constant, the load will be supplied with constant current. However, any variation in supply potential will result in a corresponding variation in load current.

In order to correct for supply voltage variations, a saturable reactor is connected across the load circuit and, as shown, includes a closed magnetic core 15 having outside legs 16 and 17 and a center leg 18. Inductance windings 19 are wound on the outside legs 16 and 17 and are each connected across the load circuit, as shown. The windings 19 are so wound and connected that their polarity is reversed with respect to each other so that the magnetic flux induced thereby in the core will flow around the outside of the core and will not pass through the center leg.

The core is variably saturated by means of a saturating winding 21 on the center leg 18 which is supplied with direct current through a rectifier 22. Due to the fact that no alternating flux passes through the center leg 18, saturation of the core can accurately be regulated by varying the direct current through the saturating winding 21 without inducing an alternating current in the winding 18.

The rectifier 22 is connected across the supply wires 11 and 12 so that its output will be proportional to the voltage across the supply wires. Preferably, means are provided to amplify the output response of the rectifier so that the saturating current will increase more rapidly than the supply voltage. As shown, the amplifying means comprises a saturable reactor 23 connected in series with the supply side of the rectifier and operating near or above the knee of its saturation curve. With this construction, a relatively small voltage increase will produce a relatively larger current increase in the saturating winding.

The voltage across the rectifier and consequently the voltage and current supplied to the saturating winding may be controlled by means of a variable resistor 24 connected in circuit with the rectifier. The resistor may operate effectively, either in series or parallel, with the input or output side of the rectifier but, as shown, is connected in shunt across the input side of the rectifier. By adjusting the resistor 24, the voltage drop across the rectifier can be regulated to regulate the saturating current supplied to the saturating winding. This resistor provides a very convenient means of adjusting the load current and serves as a limiting device to limit the voltage across the rectifier so that the rectifier will not be damaged.

In operation of the circuit a certain amount of current will always be bypassed through the reactance windings 19 but the reactance of these windings is preferably made relatively high so that the leakage current will be kept small. Upon a voltage increase, the saturating current in the winding 18 will increase to increase the saturation of the core 15, thereby reducing the reactance of the windings 19 so that a greater amount of current will flow therethrough. By properly proportioning the parts including the amplifying device 23, the current increase through the reactance windings may be made equal to the increased current from the monocyclic square in response to the voltage increase so that the current flowing through the load will remain constant. I have found that with a properly designed system, the current changes in the load can be made practically zero.

Figure 2 illustrates an alternative connection of the reactor, parts therein corresponding to like parts in Figure 1 being indicated by the same reference numerals. In this construction, the two reactance windings 19 are connected in series and are either so wound or so connected as to be reversed with respect to each other so that the alternating flux path will be around the outside of the core 15 and will not pass through the center leg 18. This construction operates in substantially the same manner as that of Figure 1 to compensate for voltage increases in the supply by reducing the reactance of the windings 19.

While two embodiments of the invention have been shown and described in detail herein, it will be understood that these are illustrative only and are not intended as a definition of the scope of the invention, reference being had for this purpose to the appended claims.

What is claimed is:

1. A current regulating device for connecting a load to a source of alternating current comprising a resonant type constant potential to constant current regulating unit connected between the source and the load, a reactor winding connected across the load side of the unit, a core for the reactor winding, a saturating winding on the core, and means responsive to the potential across the source side of the unit to supply varying saturating current to the saturating winding.

2. A current regulating device for connecting a load to a source of alternating current comprising a resonant type constant potential to constant current regulating unit connecting between the source and the load, a reactor winding connected across the load side of the unit, a core for the reactor winding, a saturating winding on the core, a rectifier connected to the saturating winding, a circuit connecting the rectifier across the source side of the unit, and means in the circuit to produce an amplified current output from the rectifier in response to voltage changes across the source side of the unit.

3. A current regulating device for connecting a load to a source of alternating current comprising a resonant type constant potential to constant current regulating unit connected between the source and the load, a reactor winding connected across the load side of the unit, a core for the reactor winding, a saturating winding on the core, a rectifier connected to the saturating winding, a circuit connecting the rectifier across the source side of the unit, and a saturable reactor in series in the circuit.

4. A current regulating device for connecting a load to a source of alternating current comprising a resonant type constant potential to constant current regulating unit connected between the source and the load, a reactor winding connected across the load side of the unit, a core for the reactor winding, a saturating winding on the core, a rectifier connected to the saturating winding, a circuit connecting the rectifier across the source side of the unit, and a variable resistor in circuit with the rectifier.

5. A current regulating device for connecting a load to a source of alternating current comprising a resonant type constant potential to constant current regulating unit connected between the source and the load, a reactor winding connected across the load side of the unit, a core for the reactor winding, a saturating winding on the core, a rectifier connected to the saturating winding, a circuit connecting the rectifier across the source side of the unit, a saturable reactor in series in the circuit, and a variable resistor in circuit with the rectifier.

6. A current regulating device for connecting a load to a source of alternating current comprising a resonant type constant potential to constant current regulating unit connected between the source and the load, a multi-legged core, reactor windings oppositely wound on two of the legs of the core connected in circuit across the load side of the unit, a saturating winding on a third leg of the core, a rectifier connected to the saturating winding to supply direct saturating current thereto, and a circuit connecting the rectifier across the source side of the unit whereby the saturating current varies in response to voltage changes across the source.

7. A current regulating device for connecting a load to a source of alternating current comprising a resonant type constant potential to constant current regulating unit connected between the source and the load, a multi-legged core, reactor windings oppositely wound on two of the legs of the core connected in circuit across the load side of the unit, a saturating winding on a third leg of the core, a rectifier connected to the saturating winding to supply direct saturating current thereto, a circuit connecting the rectifier across the source side of the unit, and a saturable reactor in series in the circuit.

8. A current regulating device for connecting a load to a source of alternating current comprising a resonant type constant potential to constant current regulating unit connected between the source and the load, a multi-legged core, reactor windings oppositely wound on two of the legs of the core connected in circuit across the load side of the unit, a saturating winding on a third leg of the core, a rectifier connected to the saturating winding to supply direct saturating current thereto, a circuit connecting the rectifier across the source side of the unit, a saturable reactor in series in the circuit, and a variable resistor in circuit with the rectifier.

KARL A. LANG.

REFERENCES CITED

The following references are of record in the file of this patent:

UNITED STATES PATENTS

| Number | Name | Date |
| --- | --- | --- |
| 1,844,633 | Brown et al. | Feb. 9, 1932 |
| 2,015,556 | Fountain | Sept. 24, 1935 |
| 2,099,715 | Young | Nov. 23, 1937 |
| 2,351,681 | Haug | June 20, 1944 |